(12) United States Patent
Venturo et al.

(10) Patent No.: US 7,680,739 B1
(45) Date of Patent: Mar. 16, 2010

(54) CHECK PROCESSING AND CATEGORIZING SYSTEM

(75) Inventors: Dominic Victor Venturo, Woodbury, MN (US); Todd Clarke Moning, Chaska, MN (US)

(73) Assignee: U.S. Bank, National Association, Minneapolis, MN (US)

( * ) Notice: Subject to any disclaimer, the term of this patent is extended or adjusted under 35 U.S.C. 154(b) by 0 days.

(21) Appl. No.: 12/267,006

(22) Filed: Nov. 7, 2008

(51) Int. Cl.
*G06Q 40/00* (2006.01)

(52) U.S. Cl. ...................................... 705/45
(58) Field of Classification Search ............ 705/45
See application file for complete search history.

(56) References Cited

U.S. PATENT DOCUMENTS

| | | | |
|---|---|---|---|
| 5,433,483 | A | 7/1995 | Yu |
| 5,630,073 | A | 5/1997 | Nolan |
| 5,631,984 | A * | 5/1997 | Graf et al. .............. 382/317 |
| 5,668,897 | A * | 9/1997 | Stolfo .................... 382/283 |
| 5,740,271 | A | 4/1998 | Kunkler et al. |
| 6,014,454 | A | 1/2000 | Kunkler |
| 6,029,144 | A | 2/2000 | Barrett et al. |
| 6,351,735 | B1 | 2/2002 | Deaton et al. |
| 7,069,240 | B2 | 6/2006 | Spero et al. |
| 2003/0061132 | A1 | 3/2003 | Yu, Sr. et al. |
| 2004/0010466 | A1 | 1/2004 | Anderson |
| 2004/0181485 | A1 | 9/2004 | Finch et al. |
| 2004/0243489 | A1 | 12/2004 | Mitchell et al. |
| 2005/0038743 | A1 | 2/2005 | Stanley et al. |
| 2006/0182331 | A1 | 8/2006 | Gilson et al. |
| 2007/0088636 | A1 | 4/2007 | Nault |
| 2007/0267477 | A1 | 11/2007 | Schott et al. |
| 2007/0276742 | A1 * | 11/2007 | Zalta ..................... 705/30 |
| 2008/0086421 | A1 | 4/2008 | Gilder et al. |
| 2008/0140579 | A1 | 6/2008 | Sanjiv |

FOREIGN PATENT DOCUMENTS

WO    WO 96/03719    2/1996

OTHER PUBLICATIONS

Chen, Z., "Electronic Payment Systems: General Review and Comparative Analysis", A Thesis in Economics submitted to Graduate Faculty of Texas Tech University, May 2004, pp. 1-45.

Chakravorti, et al., Why Invest in Payment Innovations?, Policy Studies, Emerging Payments Occasional Papers Series, Federal Reserve Bank of Chicago, Jun. 2003, pp. 1-33.

* cited by examiner

*Primary Examiner*—James Kramer
*Assistant Examiner*—Lindsay M. Maguire
(74) *Attorney, Agent, or Firm*—Foley & Lardner LLP

(57) ABSTRACT

A method for processing checks includes capturing check data from a check, where the check data includes payee information or payor information. A category of the check is identified based at least in part on the captured check data. A user account is updated with the category and at least a portion of the captured check data. The user account is analyzed to identify transactions involving paper checks. Based on the analysis, an incentive is provided to a user associated with the user account, where the incentive discourages paper check transactions by the user.

19 Claims, 2 Drawing Sheets

CHECK PROCESSING AND CATEGORIZING SYSTEM

FIELD

The subject of the disclosure relates generally to a check processing system and method. More specifically, the disclosure relates to a system, method, and computer-readable medium for intelligently and accurately categorizing check-based expenditures and deposits.

BACKGROUND

Cash, credit cards, debit cards, other electronic access vehicles, and personal checks are all instruments which consumers utilize to make expenditures for food, entertainment, travel, subscriptions, gas, utilities, etc. Most of these payment instruments, including personal checks, provide consumers with the convenience and security of not having to carry large sums of cash in order to make expenditures. Unfortunately, the inventors have perceived that paper checks and paper check processing suffer from several drawbacks. For example, the inventors have perceived that traditional check processing systems are unable to accurately and efficiently allow users to categorize and monitor their expenditures. As a result, consumers who find themselves low on funds are often unable to explain where/how all of their money is spent. As known to those in the field, the processing of paper checks is also burdensome for financial institutions and payees as compared to debit card and other electronic transactions. The inventors have perceived that paper check use and processing will continue to be a problem until paper checks can be reduced or eliminated by discouraging paper check use.

Thus, the inventors have perceived a need for a customizable and intelligent processing system in which consumer transactions are automatically categorized based on a payee or payor associated with the transaction. The inventors have also perceived a need for a processing system in which consumer initiated changes to the automatic categorization of expenditures can be globally applied to all consumers such that categorization efficiency and accuracy are maximized. The inventors have also perceived a need for a processing system which is configured to learn individual consumer handwriting such that categorization accuracy is maximized. The inventors have further perceived a need for a processing system which may provide users with an incentive to discontinue the use of paper checks.

SUMMARY

A method for processing checks includes capturing check data from a check, where the check data includes a payee name or a payor name. A category of the check is identified based at least in part on the captured check data. A user account is updated with the category and at least a portion of the captured check data. The user account is analyzed to identify transactions involving paper checks. Based on the analysis, an incentive is provided to a user associated with the user account, where the incentive discourages paper check transactions by the user. Alternatively, the incentive may encourage transactions which do not involve paper checks.

An exemplary system for processing checks is also provided. The system includes a processor. The system also includes a capture device in communication with the processor and configured to capture check data from a check, where the check data includes payee information. The system also includes a category engine in communication with the processor and configured to identify a category of the check based at least in part on the payee information. The system also includes a server in communication with the processor and configured to update a user account with the category and at least a portion of the check data. The system further includes an incentive engine in communication with the processor and configured to analyze the user account to identify expenditures made using paper checks. Based on the analysis, the incentive engine is further configured to provide an incentive to a user associated with the user account, where the incentive discourages paper check usage by the user.

Another exemplary method for processing checks includes capturing check data from a check, where the check data includes payee information. A category of the check is identified based at least in part on the payee information. A user account is updated with the category and at least a portion of the check data. An edit to the check data is received from the user, and a handwriting profile of the user is updated based on the received edit. The handwriting profile is used to improve an accuracy of subsequently captured check data associated with the user.

Other principal features and advantages will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

DETAILED DESCRIPTION

Figure 1:
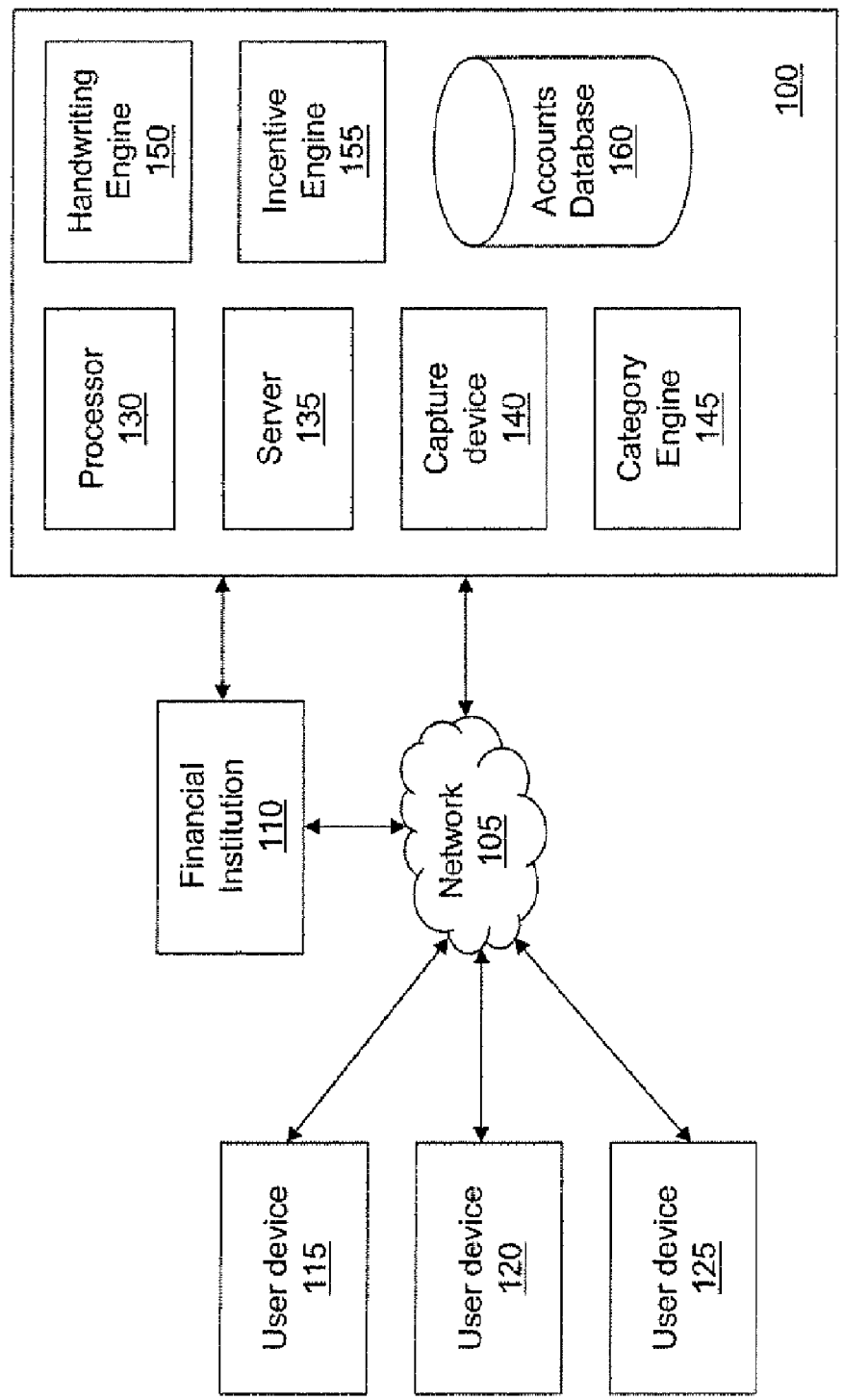
FIG. 1 is a block diagram illustrating a check processing system in a communications network in accordance with an exemplary embodiment.

FIG. 1 is a block diagram illustrating a check processing system 100 in a communications network in accordance with an exemplary embodiment. Check processing system 100 is in communication with a network 105. Network 105 can be the Internet, a local area network (LAN), a wide area network (WAN), a telecommunications network, or any other type of network through which data can be exchanged. Check processing system 100 is also in communication with a financial institution 110. The communication between check processing system 100 and financial institution 110 can be direct (i.e., check processing system 100 may be incorporated within financial institution 110) or indirect (i.e., check processing system 100 may be remote and communicate with financial institution 110 through network 105), depending on the embodiment.

Check processing system 100 is also in communication with a user device 115, a user device 120, and a user device 125 through network 105. As described in more detail below, user devices 115, 120, and 125 can be used to access and edit user accounts maintained by check processing system 100. User devices 115, 120, and 125 can include desktop computers, laptop computers, personal digital assistants, cellular telephones, network enabled gaming devices, dedicated user account workstations, point of sale payment acceptance terminals, and/or any other devices through which users can access check processing system 100.

Check processing system 100 includes a processor 130, a server 135, a capture device 140, a category engine 145, a handwriting engine 150, an incentive engine 155, and an accounts database 160. In alternative embodiments, check processing system 100 may include additional, fewer, and/or different components. Processor 130 can be used to execute any software or computer code used by check processing system 100 to perform operations which are described in more detail with reference to FIG. 2. Processor 130 can also be used to facilitate communication and interaction among the various components of check processing system 100.

In an exemplary embodiment, capture device 140 can be used to capture check data from paper checks. The paper checks can include checks written and/or deposited by users of check processing system 100. Capture device 140 can receive the paper checks from financial institution 110, automated teller machines associated with financial institution 110, automated teller machines not associated with financial institution 110, consumer remote capture devices, point of sale terminals, payees, and/or any other sources. The check data captured by capture device 140 can include a payee to which the check is made payable, a payor from which the check is received, a date of the check, an amount of the check, an account number associated with the check, a routing number associated with the check, a memorandum written on the check, a check number of the check, a signature of the check writer, a signature or other authorization of the payee, an address of the payor, any other payee information corresponding to the payee, any other payor information corresponding to the payor, and/or any other information included on the check.

Capture device 140 can include intelligent character recognition (ICR) technology, optical character recognition (OCR) technology, optical mark recognition (OMR) technology, magnetic ink character recognition (MICR) technology, scanning technology, and/or any other type of technology configured to recognize and/or capture information. In one embodiment, check processing system 100 may include a plurality of capture devices located at a plurality of locations. For example, a first capture device may be located on the premises of financial institution 110, a second capture device may be located at an automated teller machine (ATM), a third capture device may be located at the premises of a store or other payee, and so on. The plurality of capture devices can communicate captured check data to check processing system 100 through network 105 and/or any other communication networks.

In an exemplary embodiment, server 135 can receive the check data captured by capture device 140 and a category of the check from category engine 145. Server 135 can be used to maintain a network (or web) site through which user devices 115, 120, and 125 can interact with check processing system 100. The network site can provide users with access to personal user accounts. Through the user accounts, users can access and edit the captured check data and categorization information. The user accounts may also include any other information and functionality associated with a personal checking or other financial account such as account balances, debit card purchases, credit card purchases, account withdrawals, electronic payments, account deposits, investments, etc. A user can access his/her user account by logging in to the user account through a network browser or any other secure access method. The user account may require user authentication according to any method(s) known to those of skill in the art. The user accounts can be maintained in accounts database 160.

Category engine 145 can be configured to identify a category of the payee/payor associated with the check. As used herein, an engine can refer to any combination of software and/or hardware configured to perform one or more tasks. Exemplary categories can include food, restaurant, grocery, pharmacy, gasoline, department store, utility, cable/satellite television, subscription, payroll, etc. In an exemplary embodiment, the category can be identified based on a user preference. For example, a user of check processing system 100 may specify that the payee 'McDonald's' be categorized as 'fast food' as opposed to 'food' or 'restaurant.' If the user has not specified a category for a given payee name, check processing system 100 can use predetermined categorization data to categorize the check. The predetermined categorization data can be based on existing merchant category codes, based on information received from payees, based on edits received from users of check processing system 100, etc. In one embodiment, check processing system 100 may maintain a database or other repository of the predetermined categorization data. The user can also specify categories based on the payor or other check data associated with a deposited check. For example, the user may specify that checks deposited from payor ABC Co. are to be categorized as payroll.

If category engine 145 identifies a payee or payor for which the user has not provided a category and for which there is no predetermined categorization data, category engine 145 may not associate a category with the transaction. Upon a subsequent visit to his/her user account, the user who wrote or cashed the check to the uncategorized payee/payor can be provided with an opportunity to enter a category. The entered category information can be used to categorize relevant transactions. The relevant transactions can include future expenditures made by the user to the payee and/or future deposits made by the user and associated with the payor. The relevant transactions can also include previously processed expenditures and/or deposits which match the criteria. The previously processed expenditures and/or deposits can include previously categorized and previously uncategorized transactions. In one embodiment, the entered category information for a payee may also become predetermined categorization data and applied globally for use in categorizing expenditures of all system users. Any users who prefer that the payee be categorized differently can edit the categorization of that payee. Category engine 145 may also include an algorithm for intelligently identifying categories for unidentified payee names. The algorithm may be based on keyword associations. For example, in the absence of a user preference and predetermined categorization data, category engine 145 may automatically categorize any payee name including the term 'diner' as 'food.' In addition to paper check expenditures, debit card expenditures, credit card expenditures, electronic payments, deposits, and/or any other financial account activity can be categorized by category engine 145.

As described above, a user can access his/her user account to view categorized expenditures, categorized deposits, and other financial account information. The user can also edit the category provided by category engine 145 and/or any of the check data captured by capture device 140. The user may desire to edit the category because the category is incorrect, because of personal preferences, or for some other reason. In one embodiment, category edits may be reviewed by a system administrator. If a category edit is vulgar or otherwise inappropriate, the system administrator may refuse to accept the edit. If the category edit is to correct a category provided by category engine 145 or if category engine 145 was unable to provide a category, the system administrator can approve the edited category for global use. When an edited category is approved for global use, the edited category can become the default category of the payee for all users. Alternatively, the system administrator may approve the category for non-global use (i.e., for use only by the user that provided the category edit). In an alternative embodiment, a system administrator may not be used. In another alternative embodiment, an approval engine may be used to automatically accept or reject proposed category edits using an algorithm configured to determine whether proposed edits are acceptable.

The user can also edit the check data captured by capture device 140. As an example, capture device 140 may recognize a payee name on a check as 'Dandy's Grill,' when the payee was actually 'Randy's Grill.' The user can edit the payee name to correct the mistake. The user can similarly edit check data corresponding to deposited checks. In an exemplary embodiment, handwriting engine 150 can use edits to captured check data to improve the accuracy of capture device 140. Handwriting engine 150 can maintain a handwriting profile for each user. Upon receipt of a user edit of check data from a check written by the user, handwriting engine 150 can update the handwriting profile of the user with information regarding the edit. Capture device 140 can use the information in the handwriting profile to learn patterns associated with the user's handwriting. In the example above, capture device 140 can use the edit information to learn that the user's capital R is similar to a capital D. As a result, capture device 140 can be more likely to correctly identify the user's handwriting on subsequent paper checks.

In an exemplary embodiment, users can customize their user accounts based on their individual needs. For example, throughout the year, users may be able to tag expenditures as tax deductible. At the end of the tax year, the user can view all of his/her tax deductible expenditures for tax return purposes. Additional and/or different tags can also be created to provide greater flexibility in transaction categorization. For example, the user may categorize certain food expenditures as business related and others as entertainment or personal. The system can also be compatible with spreadsheet software, financial records software, and/or any other software. Users can export financial data directly from their user accounts into the software such that the financial data can be organized, manipulated, etc.

Incentive engine 155 can be used to provide users with personalized incentives based on the captured check data and/or the categorization of expenditures. A purpose of the incentives can be to dissuade users from using paper checks for subsequent expenditures and/or to encourage users to utilize an alternative form of payment. For example, a user may regularly make expenditures at a particular department store. Incentive engine 155 can identify the department store and provide the user with an incentive related to the department store. The incentive can be contingent upon the user's willingness to utilize an alternative form of payment, such as a debit card or credit card, for a subsequent purchase at the department store. The incentive can be in the form of a coupon, a percentage discount, free merchandise, points credited to a rewards program, etc. As an example, the incentive may be a 2% discount on all purchases made at the department store using a debit card. In one embodiment, the incentive can also be a monetary or other incentive to encourage the user to use direct deposit, etc. such that paper checks are not received or deposited by the user.

Figure 2:
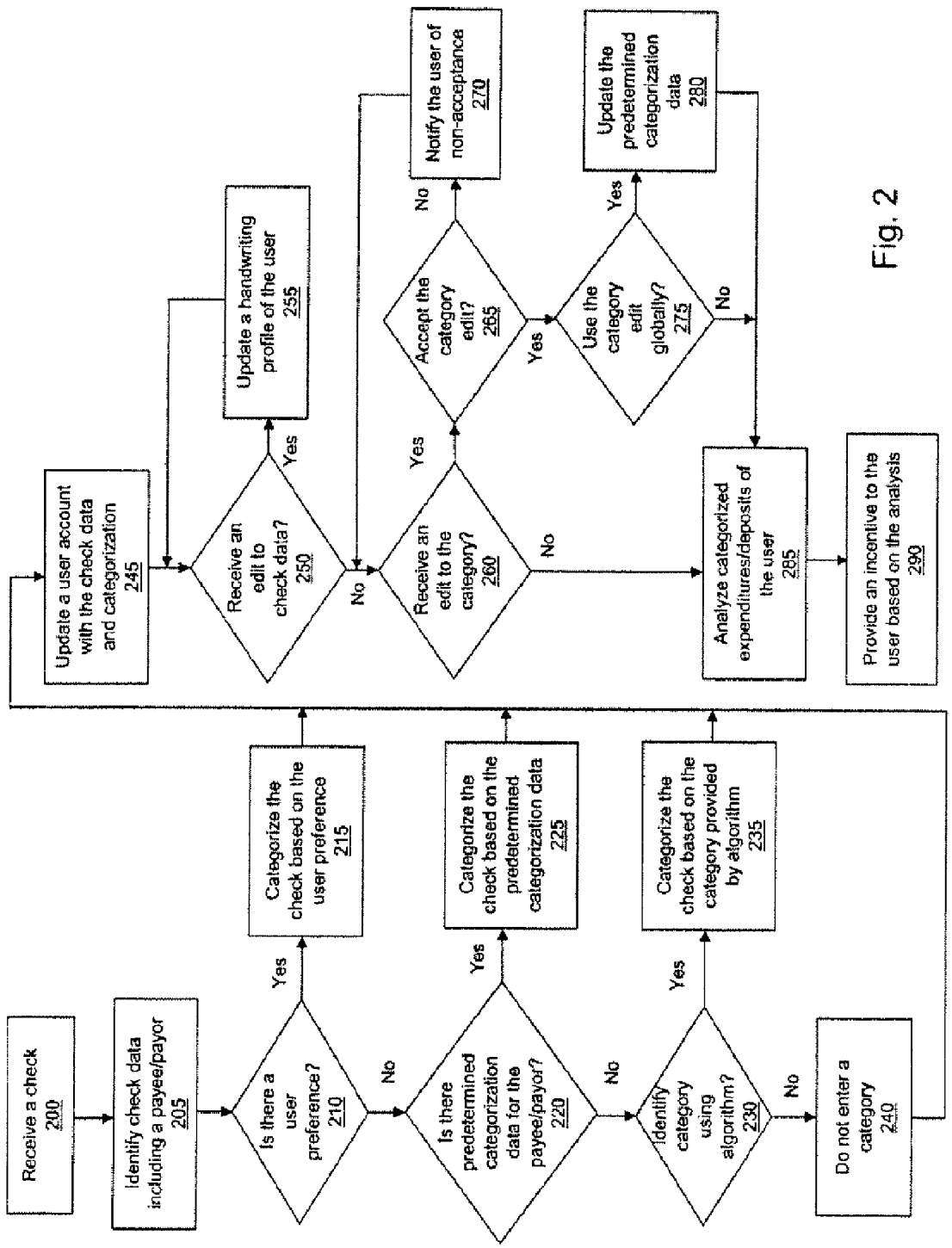
FIG. 2 is a flow diagram illustrating operations performed by a check processing system in accordance with an exemplary embodiment.

FIG. 2 is a flow diagram illustrating operations performed by a check processing system in accordance with an exemplary embodiment. In alternative embodiments, additional, fewer, and/or different operations may be performed. In an operation 200, a check is received. In an exemplary embodiment, the check is received by a capturing device at a financial institution. Alternatively, the capturing device can be located at an automated teller machine, a store, a home computer, or any other location(s). The check can be written by a user to pay for a good or service. The check may also be a payroll or other check that is deposited by the user into his/her financial account.

In an operation 205, check data, including a payee name or payor name, is identified from the received check. The check data can include the payee/payor name and/or any other information written or printed on the check. The check data can be identified with a capture device as described above with reference to FIG. 1. In an operation 210, a determination is made regarding whether there is a user preference for categorization with respect to the identified payee/payor name. The user preference can be stored in a user account and may be based on a previous category edit by the user. If there is a user preference, the check is categorized based on the user preference in an operation 215.

If there is not a user preference, a determination is made regarding whether there is predetermined categorization data corresponding to the identified payee/payor name in an operation 220. The predetermined categorization data can be stored in a categorization database, and can be used as the default for categorization if there is not a user preference. If there is predetermined categorization data, the check is categorized based on the predetermined categorization data in an operation 225. If there is not predetermined categorization data, a category is identified using an algorithm in an operation 230. The algorithm can be used to make an educated decision regarding the check based at least in part on terms included in the payee/payor name. If the algorithm is able to provide a category, the check is categorized accordingly in an operation 235. In the algorithm is not able to provide a category, no category is entered in an operation 240. In an alternative embodiment, the algorithm for determining the category may not be used.

In an operation 245, the user account of the individual user who wrote or deposited the identified check is updated with the check data and any determined categorization. The user can log in to his/her user account to access account balance information, access expenditure information, access deposit information, access categorization information, view expenditures by category, pay bills, transfer funds between accounts, etc. In an operation 250, a determination is made regarding whether an edit to the check data is received. An edit to the check data can be received from the user through a user interface used to access the user account. If an edit to the check data is received from the user, the system can update the user account to reflect the edit. The system also updates a handwriting profile of the user in an operation 255 if the edited check data is from a check written by the user. The handwriting profile can be used to store handwriting patterns and tendencies of the user. The handwriting patterns and tendencies can be used by the capture device to learn the user's handwriting, thereby improving the accuracy of subsequently identified handwritten text. Upon updating the handwriting profile, additional edits to the check data may be received in operation 250.

In an operation 260, a determination is made regarding whether an edit to the category is received. An edit to the category can be received from the user through the user interface used to access the user account. If an edit to the category is received, a determination is made regarding whether to accept the edit in an operation 265. The acceptance determination may be made manually by one or more system administrators. The system administrators can review the edits to ensure that the category is not vulgar or otherwise inappropriate. Alternatively, the acceptance determination may be made automatically using an acceptance algorithm configured to determine whether the proposed edit is appropriate. If the category edit is not accepted, the user is notified of the non-acceptance in an operation 270. The system can determine whether a subsequent edit to the category is received in operation 260.

If the category edit is accepted, the user account can be updated to reflect the edit. As such, all relevant transactions can be categorized based on the edit. The relevant transactions can include future expenditures made to the payee by the user and/or future checks deposited from the payor. The relevant transactions can also include previously processed expenditures and/or deposits which match the criteria. The previously processed expenditures and/or deposits can include previously categorized and previously uncategorized transactions. Further, if the category edit is accepted for a check written by the user, a determination is made regarding whether to use the category edit globally in an operation 275. The determination can be made manually or automatically, depending on the embodiment. The determination can be based on a number of factors, including whether the predetermined categorization data includes a category for the payee name, the number of category edits that have been received regarding the payee name, etc. If it is determined that the category edit is to be used globally, the predetermined categorization data is updated in an operation 280. As a result, the category as edited can be applied to expenditures made by all users to the payee. As an example, the system may erroneously categorize a grocery store payee as a restaurant payee. Based on one or more received user edits, the system can determine that the payee is a grocery store. As such, the system can update the predetermined categorization data to indicate that the payee is a grocery store, and the update can be used to categorize the payee for all users. As another example, the predetermined categorization data used by the system may categorize all fast food restaurants as 'restaurants.' A user may prefer to have all fast food expenditures categorized as 'fast food.' As such, the user can edit the categorization such that expenditures to fast food payees are categorized as 'fast food.' Such an edit may be applied only to the user's account, and not globally for all users.

Regardless of whether edits are received and how they are handled, the system analyzes categorized expenditures and deposits of the user in an operation 285. The system can analyze the expenditures to identify categories in which the user writes most of his/her paper checks. The system can also analyze the expenditures to identify specific payees from which the user makes purchases with paper checks. The system can analyze the deposits to identify categories in which paper checks are deposited from specific payors. In an operation 290, the system provides an incentive to the user based on the analysis. In an exemplary embodiment, the incentive can be a monetary or other incentive to discourage the user from using paper checks for future expenditures and/or to encourage the user to use an alternative form of payment for future expenditures. The alternative form of payment can include debit cards, credit cards, or any other paperless form of payment known to those of skill in the art. The incentive can also be a monetary or other incentive to encourage the user to use direct deposit, etc. such that paper checks are not deposited by the user. The system can further use the analysis for marketing purposes.

As an example, based on an analysis of the user account, the system may determine that the user makes most or all of his/her gas station expenditures with a debit card and most or all of his/her grocery store expenditures via paper checks. Based on the analysis, the system can provide the user with an incentive to use the debit card for future expenditures at the grocery store. The incentive may be a coupon for free or discounted food, a dollar amount off of subsequent purchases, a percentage off of subsequent purchases, etc. Alternatively, any other type of incentive may be used. The incentive can be contingent on the method of payment such that the user may receive the incentive only if he/she pays with a debit card. Alternatively, the user may receive the incentive if he/she pays using any form of payment other than a paper check. The incentive can be to a specific grocery store used by the user or to participating grocery stores in general, depending on the embodiment.

The operations of FIG. 2 have been described with reference to a paper check. However, it is to be understood that the embodiments described herein are not limited to categorization of paper checks. The embodiments can also be applied to categorization of any other types of expenditures and/or deposits associated with a financial account, such as debit card, electronic withdrawals, etc. In one embodiment, any of the operations performed by the check processing systems described herein can be implemented as instructions stored in a computer-readable medium. The instructions can be configured to cause the processor to execute the operations.

One or more flow diagrams have been used herein. The use of flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method for processing checks, comprising:
    capturing check data from a check with a capture device, wherein the check data includes payee information or payor information;
    identifying a category of the check based at least in part on the captured check data, wherein the category is identified using a processor of a check processing system;
    updating a user account with the category and at least a portion of the captured check data;
    analyzing the user account to identify transactions involving paper checks; and based on the analysis, providing a monetary incentive to a user associated with the user account, wherein the monetary incentive discourages paper check transactions by the user.

2. The method of claim 1, further comprising receiving an edit to the category from the user.

3. The method of claim 2, further comprising applying the received edit globally if it is determined that the received edit is acceptable for global use.

4. The method of claim 2, further comprising:
    determining whether to accept the received edit; and
    if the received edit is accepted, using the received edit to categorize relevant transactions.

5. The method of claim 1, further comprising:
    receiving an edit to the check data from the user;
    updating a handwriting profile of the user based on the received edit; and
    using the handwriting profile to improve an accuracy of subsequently captured check data associated with the user.

6. The method of claim 1, wherein the monetary incentive comprises a coupon, a percentage discount, or a dollar discount.

7. The method of claim 1, wherein the monetary incentive also encourages the user to use an alternative form of payment.

8. A system for processing checks, the system comprising:

a processor;

a capture device in communication with the processor and configured to capture check data from a check, wherein the check data includes payee information;

a category engine in communication with the processor and configured to identify a category of the check based at least in part on the payee information;

a server in communication with the processor and configured to update a user account with the category and at least a portion of the check data; and an incentive engine in communication with the processor and configured to analyze the user account to identify expenditures made using paper checks; and based on the analysis, provide a monetary incentive to a user associated with the user account, wherein the monetary incentive discourages paper check usage by the user.

9. The system of claim 8, wherein the category engine is further configured to receive an edit to the category from the user.

10. The system of claim 9, wherein the category engine is further configured to apply the received edit globally if it is determined that the received edit is acceptable for global use.

11. The system of claim 9, wherein the category engine is further configured to:

determine whether to accept the received edit; and if the received edit is accepted, use the received edit to categorize relevant expenditures of the user made to a payee corresponding to the payee information.

12. The system of claim 8, further comprising a handwriting engine configured to:

receive an edit to the check data from the user; and update a handwriting profile of the user based on the received edit;

wherein the capture device is configured to use the handwriting profile to improve an accuracy of subsequently captured check data associated with the user.

13. The system of claim 8, wherein the monetary incentive comprises a coupon, a percentage discount, or a dollar discount.

14. The system of claim 8, wherein the monetary incentive further encourages the user to use an alternative form of payment.

15. A method for processing checks, comprising:

capturing check data from a check with a capture device, wherein the check data includes payee information;

identifying a category of the check based at least in part on the payee information, wherein the category is identified using a processor of a check processing system;

updating a user account with the category and at least a portion of the check data;

receiving an edit to the check data from the user;

updating a handwriting profile of the user based on the received edit;

using the handwriting profile to improve an accuracy of subsequently captured check data associated with the user; and analyzing the user account to identify expenditures made using paper checks; and based on the analysis providing a monetary incentive to a user associated with the user account, wherein the monetary incentive discourages paper check usage by the user.

16. The method of claim 15, further comprising receiving a second edit to the category from the user.

17. The method of claim 16, further comprising applying the received second edit globally if it is determined that the received second edit is acceptable for global use.

18. The method of claim 16, further comprising:

determining whether to accept the received second edit; and if the received second edit is accepted, using the received second edit to categorize relevant expenditures of the user made to a payee corresponding to the payee information.

19. The method of claim 15, wherein the monetary incentive encourages the user to use an alternative form of payment.

\* \* \* \* \*